April 16, 1929.   H. F. SHINDEL   1,709,195
GOGGLES ATTACHMENT FOR SPECTACLES
Filed Aug. 18, 1926
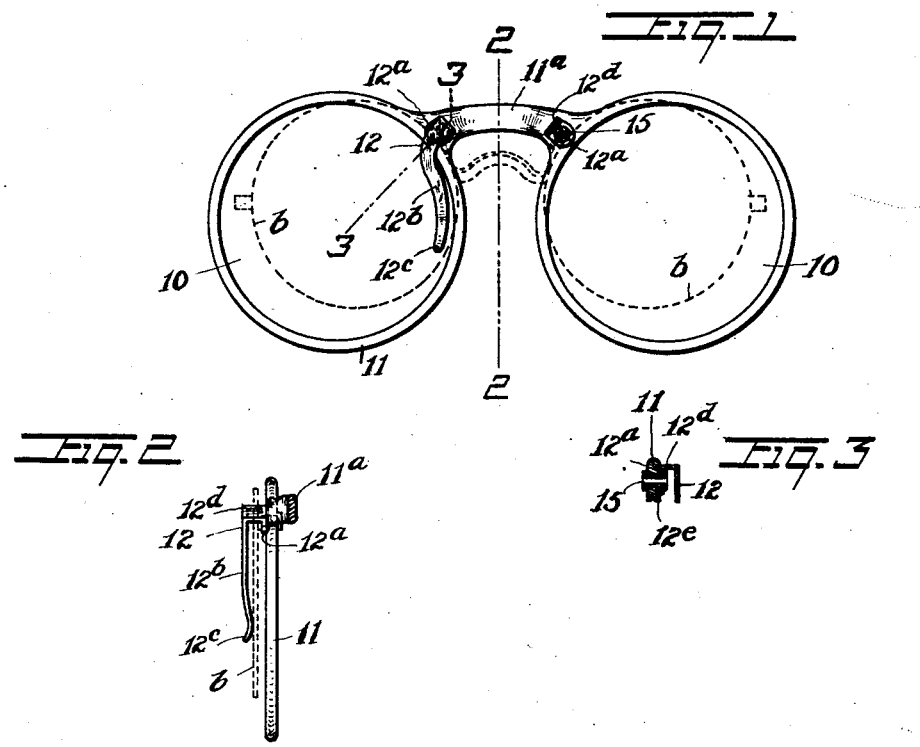
Harry F. Shindel,
INVENTOR.
BY
ATTORNEYS.

Patented Apr. 16, 1929.

1,709,195

UNITED STATES PATENT OFFICE.

HARRY F. SHINDEL, OF READING, PENNSYLVANIA, ASSIGNOR TO WILLSON PRODUCTS, INC., OF READING, PENNSYLVANIA, A CORPORATION OF PENNSYLVANIA.

GOGGLES ATTACHMENT FOR SPECTACLES.

Application filed August 18, 1926. Serial No. 129,909.

My invention relates particularly to goggle attachments for spectacles, and my main object is to provide a simply constructed spectacle-frame attachment which can be readily applied to spectacles of varying size and nose-bridge construction, with symmetrical positioning and maintenance of substantial parallelism, of the goggle glasses relative to the spectacle lenses. The invention is fully set forth in connection with the accompanying drawing illustrating a preferred embodiment thereof, and the novel features are clearly defined in the appended claim.

Fig. 1 is an inner-face view of a pair of goggles embodying my invention; one of the positioning and retaining clips being partly broken away, and ordinary spectacles to which they are attachable being indicated in dotted outline.

Fig. 2 is a cross-sectional edge-view on the line 2—2 of Fig. 1; showing the lower portion of the positioning and retaining clip in contact with the inner face of a corresponding spectacle or eyeglass lens which is indicated by dotted lines.

Fig. 3 is a detail cross-sectional view on the line 3—3 of Fig. 1, showing the preferred manner of rigidly connecting the clip-ear to the rigid framing of the attachment.

My improved attachment comprises a pair of goggle or supplementary glasses 10, 10, spacedly mounted in an integrally formed framing 11 having a rigid integral connecting nose-bridge 11$^a$; and a pair of spaced-apart positioning and retaining spring clips 12, 12 of sheet material, secured to the framing by means of connecting ears 12$^a$, 12$^a$, and having inwardly-set depending portions 12$^b$ extending downward from the bridge portion of the framing adjacent the inner faces of the respective goggle glasses to the lower portions of the latter; these depending portions being adapted to yieldingly span variably sized lenses $b$, $b$ of the spectacles or eyeglasses on which the attachment is to be mounted, as indicated in Figs. 1 and 2, and to contact at their lower portions with the inner faces of said spanned spectacle lenses so as to retain the applied goggle lenses in substantial parallelism with the corresponding spectacle lenses as indicated in Fig. 2. The lower extremity 12$^c$ of each depending clip 12, is bent away from the adjacent inner face of the corresponding goggle glass 10 so as to facilitate the downward spectacle-engaging movement of the attachment; and the main portion of the depending clip is shaped so as to overlie only the inner side portion of the lens with which it contacts to maintain substantial parallelism of the glass and lens. The downward engaging movement of the attachment on the spectacle is limited by contact of the off-setted upper portions 12$^d$ of the clips with the edges of the corresponding spectacle lenses or framing; the preferred arrangement illustrated showing the goggle glasses symmetrically positioned laterally, with the excess area thereof extending below and laterally beyond the lenses as is ordinarily desirable.

My improved attachment as illustrated has an imitation shell framing 11, with the lenses 10, 10 fixedly spaced by the integral nose bridge 11$^a$; each of the separately formed positioning and retaining clips 12, 12 being fixedly connected thereto preferably by a single riveting eyelet 15 which passes through a connecting ear 12$^a$ of the clip; said ear being non-rotatably seated in the relatively soft framing material by means of an engaging radial rib or ribs 12$^e$ as indicated in Figs. 2 and 3. The attachment is applied to the spectacles by simply pressing it down upon the latter with the clips 12, 12 spanning the adjacent edge portion of the corresponding spectacle lenses and contacting with the lower portions of the latter to yieldingly retain the attachment with the glasses thereof symmetrically positioned laterally and in parallelism with the lenses of the spectacles. The spaced eye edges of the integrally formed attachment framing may contact with the sides of the nose so as to directly carry the same independently of the supporting nose bridge for the spectacles, or the weight of the attachment may be carried by the latter, as determined by the face-formation of the wearer, but in any case the glasses of the attachment are properly retained with respect to the spectacle lenses both as to lateral positioning and parallelism and independently of the spectacle nose-bridge construction, while the shaped lens-contacting clips are located well inward from the line of vision. The specific construction set forth may be readily modified within the scope of the invention as defined in the subjoined claim.

What I claim is:

In combination with spectacles having lens framings with a rigid nose-bridge connection; a pair of supplementary-lens supporting and positioning spring clips separately secured to the inner face of the nose-bridge adjacent the respective lens framings, and each formed of a sheet-metal strip having its upper portion bent to provide a bridge-connecting ear and a frame-rest offset, and its depending portion bent to intermediately project farther inward from the marginal portion of the lens than the extremity thereof.

In testimony whereof I affix my signature.

HARRY F. SHINDEL.